United States Patent
Fornasiero et al.

(10) Patent No.: US 11,772,087 B2
(45) Date of Patent: Oct. 3, 2023

(54) REACTIVE MEMBRANE NETWORKS FOR CWA PROTECTION

(71) Applicant: Lawrence Livermore National Security, LLC, Livermore, CA (US)

(72) Inventors: Francesco Fornasiero, Oakland, CA (US); Edmond Y. Lau, Dublin, CA (US); Carlos A. Valdez, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 396 days.

(21) Appl. No.: 17/009,582

(22) Filed: Sep. 1, 2020

(65) Prior Publication Data

US 2022/0062885 A1    Mar. 3, 2022

(51) Int. Cl.
*B01J 35/06* (2006.01)
*B01J 37/02* (2006.01)
*B01J 35/10* (2006.01)

(52) U.S. Cl.
CPC ......... *B01J 35/065* (2013.01); *B01J 35/1061* (2013.01); *B01J 35/1066* (2013.01); *B01J 35/1071* (2013.01); *B01J 35/1076* (2013.01); *B01J 37/0215* (2013.01)

(58) Field of Classification Search
None
See application file for complete search history.

(56) References Cited

U.S. PATENT DOCUMENTS

2004/0234840 A1* 11/2004 Sudo ................... H01M 4/8652
429/493

2010/0081028 A1* 4/2010 An ........................ H01M 4/925
429/480

OTHER PUBLICATIONS

Wikipedia, "Cyclen," Wikipedia, 2020, 4 pages, retrieved from https://en.wikipedia.org/wiki/Cyclen.
Wikipedia, "DOTA (chelator)," Wikipedia, May 2020, 4 pages, retrieved from https://en.wikipedia.org/wiki/DOTA_(chelator).
Wikipedia, "Porphyrin," Wikipedia, 2020, 10 pages, retrieved from https://en.wikipedia.org/wiki/Porphyrin.
Wikipedia, "Sarin," Wikipedia, 2020, 12 pages, retrieved from https://en.wikipedia.org/wiki/Sarin.
Wikipedia, "VX (nerve agent)," Wikipedia, 2020, 13 pages, retrieved from https://en.wikipedia.org/wiki/VX_(nerve_agent).
Wikipedia, "Mustard gas," Wikipedia, 2020, 17 pages, retrieved from https://en.wikipedia.org/wiki/Mustard_gas.

(Continued)

Primary Examiner — Colin W. Slifka
(74) Attorney, Agent, or Firm — Zilka-Kotab, P.C.

(57) ABSTRACT

A membrane includes a first layer, and a second layer coupled to the first layer. The second layer includes a network of catalytic sites, each catalytic site having a catalytic center characterized by promoting a chemical reaction of a target material. A method of forming a chemically reactive membrane includes applying a first solution to a structure, the first solution includes a macrocyclic ligand having electron-donating ligands and a side functional group for crosslinking, crosslinking a plurality of the macrocyclic ligand to form a first network of crosslinked macrocyclic ligands, and applying a second solution to the structure, the second solution comprising a catalytic center. Each catalytic center complexes with the electron-donating ligands of each macrocyclic ligand to form catalytic sites in the first network of crosslinked macrocyclic ligands.

28 Claims, 6 Drawing Sheets

(56) References Cited

OTHER PUBLICATIONS

Rogge et al., "Metal-organic and covalent organic frameworks as single-site catalysts," Chemical Society Reviews, vol. 46, 2017, pp. 3134-3184.

Brewer, S., "Recent Advances in Breathable Barrier Membranes for Individual Protective Equipment," Recent Patents on Materials Science, vol. 4, 2011, pp. 1-14.

Wartell et al., "Strategies to Protect the Health of Deployed U.S. Forces: Force Protection and Decontamination," National Academy of Sciences, 1999, 263 pages.

Lomax, G.R., "Breathable polyurethane membranes for textile and related industries," Journal of Materials Chemistry, vol. 17, 2007, pp. 2775-2784.

Koziol et al., "Toward a Small Molecule, Biomimetic Carbonic Anhydrase Model: Theoretical and Experimental Investigations of a Panel of Zinc(II) Aza-Macrocyclic Catalysts," Inorganic Chemistry, 2012, vol. 51, pp. 6803-6812.

Kimura et al., "Carboxyester Hydrolysis Promoted by a New Zinc(II) Macrocyclic Triamine Complex with an Alkoxide Pendant: A Model Study for the Serine Alkoxide Nucleophile in Zinc Enzymes," Journal of the American Chemical Society, vol. 116, 1994, pp. 4764-4771.

Mayer et al., "P-Edited Diffusion-Ordered H NMR Spectroscopy for the Spectral Isolation and Identification of Organophosphorus Compounds Related to Chemical Weapons Agents and Their Degradation Products," Analytical Chemistry, vol. 84, 2012, pp. 10478-10484.

Kimura et al., "Phosphodiester Hydrolysis by a New Zinc(II) Macrocyclic Tetraamine Complex with an Alcohol Pendant: Elucidation of the Roles of Ser-102 and Zinc(II) in Alkaline Phosphatase," Journal of the American Chemical Society, vol. 117, 1995, pp. 8304-8311.

Kim et al., "Preparation of Ultrathin Films of Molecular Networks through Layer-by-Layer Cross-Linking Polymerization of Telrafunctional Monomers," Macromolecules, vol. 44, 2011, pp. 7092-7095.

Byeon et al., "Biomimetic Liquid-Sieving through Covalent Molecular Meshes," Chemistry of Materials, vol. 28, 2016, pp. 8044-8050.

Byeon et al., "Precise Solution-Based Deposition of Ultrathin Covalent Molecular Networks by Layer-by-Layer Cross-Linking Polymerization of Tetra- and Bifunctional Amine/Isocyanate Pairs," Macromolecules, vol. 50, 2017, pp. 6796-6803.

\* cited by examiner

Alkyne-displaying macrocycles

Azide-displaying macrocycles

REACTIVE MEMBRANE NETWORKS FOR CWA PROTECTION

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to membranes, and more particularly, this invention relates to a chemically reactive membrane for trapping and/or decomposing chemical and biological agents.

BACKGROUND

The current chemical and biological threat environment includes broadly acting, highly pathogenic, and sometimes immediately lethal threats. Despite substantial financial investments and advances in the Chemical/Biological (CB) Defense enterprise over many decades, current personal protective equipment (PPE) solutions add logistical, mobility, and thermal challenges to the warfighters, first responders, and care providers, which place their missions at risk. For example, typical PPE include cumbersome suits that fully block the threat but also water vapor transport. In addition, typical PPE tends to have heavyweight, thick laminates with limited adsorption capability for the hazardous components. These bulky suits require assistance and infrastructure for proper donning and doffing, and decontamination procedures to avoid contamination from agents that may still be present on the PPE.

For conventional wearable material, the inability of the material to dissipate heat effectively through water vapor transport causes the body temperature to rise to dangerous levels. Thus, there is a limited time of wear and operation before the body is at risk of a heat stroke. Another issue is contamination of the material, such that although the wearer is protected while wearing the material, the individual experiences a secondary exposure to the chemical and/or biological agents during the procedure of removing the worn material. Currently there is no mechanism for inactivation, decomposition, etc. of surface contaminants while the material is being worn.

The threat of chemical and/or biological agents crossing the layers of PPE material, even substantially impermeable layers, is a serious issue. For example, there is a limited time duration of wearing conventional butyl gloves while working with nerve agents before the nerve agent crosses the layers of the glove from the exposed external surface of the glove to the skin of the wearer.

Thus, it would be highly desirable to develop a material that has the capability of trapping a chemical and/or biological agent, and/or inactivating, decomposing, etc. the agent to prevent any secondary exposure to the agent.

In a humanitarian assistance setting, the hours needed to don, doff, and decontaminate PPE leaves roughly two hours in an eight hour workday for a care provider to spend with patients. These procedures limit the efficacy of worker operations in pandemic outbreak scenarios. In a military context, standard military PPE constrains mobility and wear time because of their weight and high thermal burden, thereby negatively impacting warfighter operations.

A material is needed that combines protection from harmful agents by blocking the transport of the agent through the material with breathability for extended time duration of wear.

SUMMARY

In one embodiment, a membrane includes a first layer, and a second layer coupled to the first layer. The second layer includes a network of catalytic sites, each catalytic site having a catalytic center characterized by promoting a chemical reaction of a target material.

In another embodiment, a method of forming a chemically reactive membrane includes applying a first solution to a structure, the first solution includes a macrocyclic ligand having electron-donating ligands and a side functional group for crosslinking, crosslinking a plurality of the macrocyclic ligand to form a first network of crosslinked macrocyclic ligands, and applying a second solution to the structure, the second solution comprising a catalytic center. Each catalytic center complexes with the electron-donating ligands of each macrocyclic ligand to form catalytic sites in the first network of crosslinked macrocyclic ligands.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that, ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt % is defined as the percentage of weight of a particular component to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the final product in which the component is present, and preferably results in a change of the characteristic to within a desired range. One skilled in the art, now armed with the teachings herein, would be able to readily determine an effective amount of a particular component without having to resort to undue experimentation.

The description herein is presented to enable any person skilled in the art to make and use the invention and is provided in the context of particular applications of the invention and their requirements. Various modifications to the disclosed embodiments will be readily apparent to those skilled in the art upon reading the present disclosure, including combining features from various embodiment to create additional and/or alternative embodiments thereof.

Moreover, the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

The following description discloses several preferred embodiments of membrane material for protection from chemical and biological agents and/or related systems and methods.

In one general embodiment, a membrane includes a first layer, and a second layer coupled to the first layer. The second layer includes a network of catalytic sites, each catalytic site having a catalytic center characterized by promoting a chemical reaction of a target material.

In another general embodiment, a method of forming a chemically reactive membrane includes applying a first solution to a structure, the first solution includes a macrocyclic ligand having electron-donating ligands and a side functional group for crosslinking, crosslinking a plurality of the macrocyclic ligand to form a first network of crosslinked macrocyclic ligands, and applying a second solution to the structure, the second solution comprising a catalytic center. Each catalytic center complexes with the electron-donating ligands of each macrocyclic ligand to form catalytic sites in the first network of crosslinked macrocyclic ligands.

A list of acronyms used in the description is provided below.
2D two-dimensional
CB Chemical/Biological
CWA Chemical warfare agent
DOTA dodecane tetraacetic acid
GB (RS)-Propan-2-yl methylphosphonofluoridate (Sarin)
HD bis(2-chloroethyl)sulfide (Mustard gas)
N Nitrogen
nm nanometer
PPE personal protective equipment
μm micron
VX Ethyl ({2-[bis(propan-2-yl)amino]ethyl}sulfanyl)(methyl)phosphinate Current CB protective apparel (passive impermeable barriers or heavy-weight multilayer adsorptive laminates) sacrifice breathability to prevent exposure to harmful agents and thus cannot simultaneously provide broad spectrum shielding and low thermal/logistical burden. One embodiment described herein overcomes the protection-breathability trade-off by implementing an ultrathin porous reactive membrane. Combined with improved garment protection, catalytic decontamination activity of the ultrathin porous reactive membrane reduces, and may likely minimize or eliminate, secondary exposure. According to one embodiment, the ultrathin porous membrane is fabricated to result in a layer having crosslinked multifunctional catalytic sites that are selected for their reactivity toward chemical agents. The breathable, multifunctional membrane prevents CB permeation and self-decontaminates when exposed to chemical warfare agents (CWA).

According to one embodiment, the reactive nature of the components of the membrane allows protection from chemical threats on contact by reacting with the chemical and/or biological agent and deactivating, decomposing, etc. the agent at contact. A method of forming the membrane allows a fine control of the thickness and defined tuning of incorporation of different types of molecules in different layers. In one approach, the membrane may be engineered to provide protection to multiple types of chemical threats with different catalytic groups that are specifically targeted and optimized for a specific threat. For example, a membrane may protect against the nerve agent Sarin by having a network of catalytic sites that are optimized to deactivate the Sarin molecule. In another approach, a membrane may protect against multiple different biological/chemical threats. For example, a mixture of catalytic groups in the membrane may be chosen to specifically deactivate more than one threat, e.g., Sarin and mustard gas.

According to one embodiment, a method of forming the membrane includes incorporation of different catalytic centers layer by layer. For example, the method may include forming a series of different layers with one layer created from one solution including one type of macrocyclic catalytic ligands having functionalities for one type of crosslinking and a specific porosity, a second layer being formed with a second solution including another type of catalytic macrocyclic ligands having complementary functionalities for crosslinking and possibly a different porosity, etc. The membrane may be tuned for a specific chemical threat and engineered for a defined thickness of the layer. The membrane may be tuned for specific catalytic decontamination activity designed to minimize secondary exposure and cross contamination. The membrane may be grown monolayer by monolayer, thereby enabling fine control of the thickness, porosity, composition, etc. of the membrane. Moreover, the breathability, protection, reactivity, etc. may be co-optimized by the fabrication process.

Figure 1:
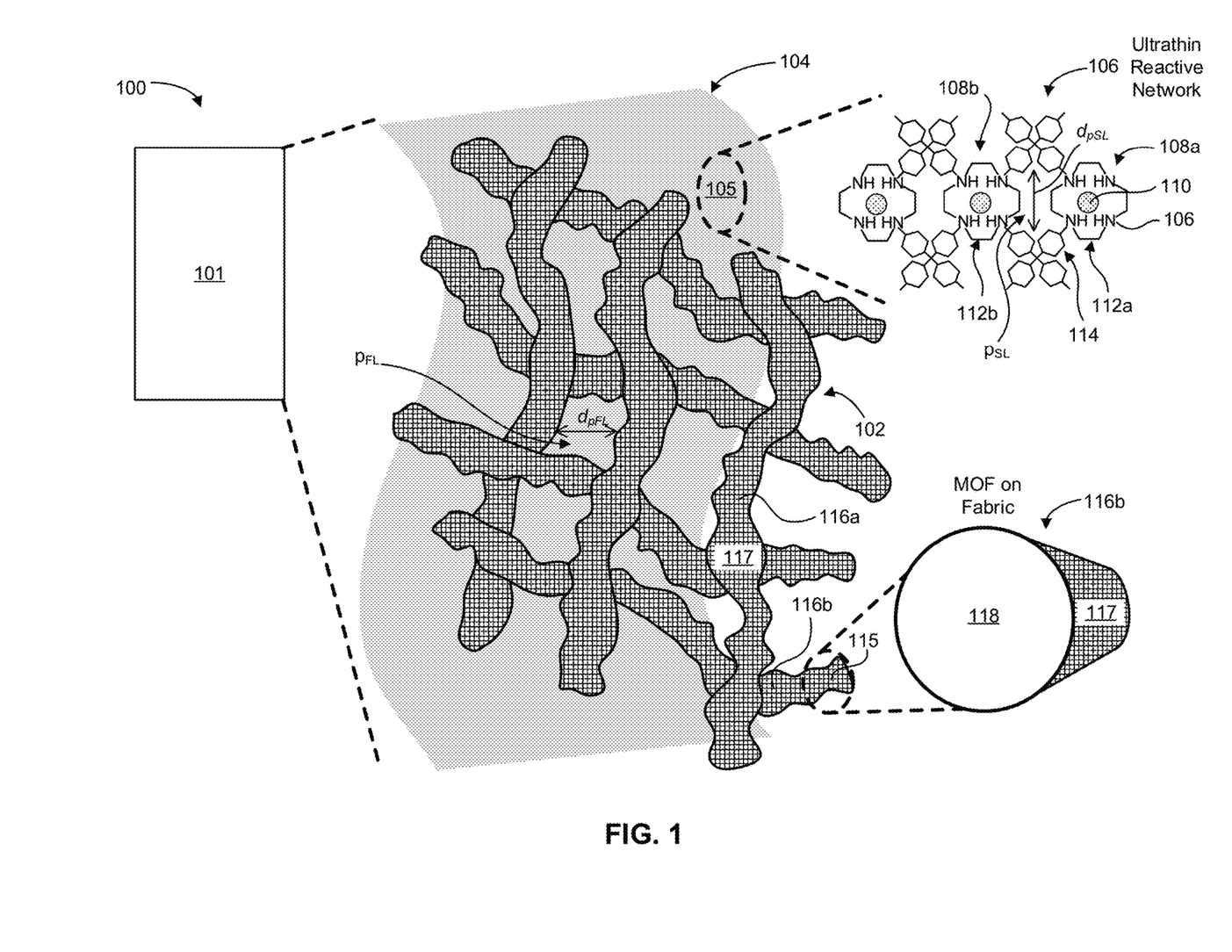
FIG. 1 is a schematic drawing of expanded views of a permeable membrane having a chemical reactive layer, according to one embodiment.

FIG. 1 depicts an ultrathin multifunctional membrane 100, in accordance with one embodiment. As an option, the present membrane 100 may be implemented in conjunction with features from any other embodiment listed herein, such as those described with reference to the other FIGS. Of course, however, such membrane 100 and others presented herein may be used in various applications and/or in permutations which may or may not be specifically described in the illustrative embodiments listed herein. Further, the membrane 100 presented herein may be used in any desired environment.

In one embodiment, the membrane 100 comprises a combination of layers that provide protection and decontamination of chemical and/or biological agents (e.g., chemical warfare agents (CWA)). FIG. 1 illustrates a portion 101 of a membrane 100 that includes a first layer 102 and a chemically reactive second layer 104.

The membrane 100 includes a chemically reactive second layer 104 coupled to a first layer 102. The chemically reactive second layer 104 and possibly the first layer 102 may be impervious to a target material. In some approaches, the chemically reactive second layer 104 and in some cases the first layer 102 may be impermeable to aerosols, bacteria, viruses, toxins, etc. For example, the chemically reactive second layer 104 and possibly the first layer 102 may be impervious to nerve agents. Further, the chemically reactive second layer 104 and possibly the first layer 102 may be impervious to biological agents.

The porosity of the chemically reactive layer may be tuned by the type of catalytic units and crosslinking groups desired for the chemically reactive network. In one example, a membrane having one or more layers of a homogenous type of catalytic sites may have a homogeneous porosity across the thickness of the membrane.

In another approach, the first layer is permeable to water vapor. For example, in FIG. 1, the first layer 102 may be an ultra-permeable membrane to allow transport of water vapor. The first layer 102 may be porous characterized by a plurality of pores having an average diameter in a defined range. In various approaches, the average diameter of the pores may be smaller than something to be excluded by size exclusion (e.g., biological agents), and/or larger than something desired to be allowed to pass therethrough (e.g., water molecules), or may not exclude any molecule by size (e.g., molecules larger than a water molecule), etc. For example, the first layer 102 may provide solely mechanical support for the ultrathin chemically reactive second layer 104. Further, a coating of the first layer 102 with a reactive and/or absorbent material like MOF 117 may provide some protection from chemical threats.

The first layer 102 may be permeable to water vapor and impermeable to aerosols, bacteria, viruses, toxins, etc. In one approach a range of the average diameter d of the pores $p_{FL}$ of the first layer may be greater than 0 nanometers and less than 100 microns. In various approaches, a first layer 102 comprising a fabric, fiber, etc. may include pores $p_{FL}$ having an average diameter d greater than 10 microns.

The first layer of the membrane may include a material for strengthening the membrane. In one approach, as shown in FIG. 1, the first layer 102 of the membrane 100 may comprise a network of fibers 116a, 116b. In another approach, the first layer provides mechanical support to chemically reactive second layer 104 as well as aids protection by soaking and/or degrading chemical threats. For example, as shown in the expanded view of a portion 115 of fiber 116b, a metal organic framework (MOF) 117 may coat individual fibers 116a, 116b of fabric material 118 to enhance chemical threat protection. In one approach, the first layer may include fabric material, made of porous or non-porous fibers, electrospun fibers, electrospun nanofibers, other non-woven textiles, etc. In another approach, the first layer may include block copolymers. In another approach, the first layer may include nanoporous single layers, nanoporous graphene, two-dimensional (2D) layered materials such as graphene oxide, reduced graphene oxide, etc. In another approach, the first layer may include nanotubes, nanotube mats, etc. In yet another approach, the first layer may include composites of MOF, 2D materials, oriented arrays, polymer composites, nanotubes with polymers in various morphologies (films, fibers, nanofibers, etc.), etc. In another approach, the first layer may include a combination of materials, e.g., MOF and fabric, MOF and block copolymer, fabric and block copolymers, nanotubes and block copolymers, etc.

The second layer 104 of the membrane 100 may be configured to block, trap and/or neutralize chemical and/or biological agents.

In one approach, the chemically reactive second layer 104 is porous. The pores $p_{SL}$ of the second layer 104 may have an average diameter d in a range of greater than zero to less than about two nanometers. The sub-nanometer pores $p_{SL}$ of the second layer 104 are preferably small enough to block penetration of aerosols, bacteria, viruses, toxins, etc.

In one approach, the membrane may have a gradient of porosity. A series of layers of a membrane may have increasing or decreasing porosity by tuning the functional group for crosslinking of each layer. The functional group for crosslinking may define the distance between catalytic sites and thus define an average diameter d of the pores $p_{SL}$ of the chemically reactive layer. For example, to engineer a smaller pores $p_{SL}$ in the chemically reactive layer, a functional group 114 for crosslinking may be selected that diminishes the average diameter $d_{pSL}$ of the pores $p_{SL}$ between adjacent crosslinking groups.

Moreover, the second layer 104 is a chemically reactive layer and may be configured to stop, trap, etc. chemical and/or biological threats (e.g., nerve agent VX, OP-based nerve agents, N- and S-mustards as well as Lewisites I, II and III) and/or decompose (e.g., nerve agents GB (Sarin), VX, HD (mustard gas), etc.) chemical and/or biological threats upon contact. In one case, a chemical/biological agent may decompose at contact with the chemically reactive layer. In another case a chemical/biological agent may be trapped in the chemically reactive layer (e.g., adsorbed, complexed, etc.), but may not decompose. The finely tunable thinness and porosity of the membrane may also enable minimization of resistance to water vapor transport and thus minimize thermal burden. In addition, the reactive membrane may be configured to prevent aerosol convective transport across the underlying textile layer.

According to one embodiment, the membrane 100 includes a first layer 102 and a second layer 104 coupled to the first layer 102. In one approach, the second layer 104 may be positioned above the first layer 102. In one approach, the second layer 104 may be formed above the first layer. In some approaches, one or more intervening layers may be formed between the first and second layer, e.g., in a laminate structure. In one approach, the first layer may include one or more sublayers. In one approach, the second layer may include one or more sublayers.

The second layer 104 of the membrane 100 includes a network 106 of catalytic sites 108a, 108b. As shown the expanded view of a portion 105 of the second layer 104, each catalytic site 108a, 108b of the network 106 includes a catalytic center 110 characterized by promoting a chemical reaction of a target material. For example, the catalytic center may promote a chemical reaction to a toxin, a CWA, a biohazard, a virus or other biotic, or any combination thereof.

In one approach, each catalytic site 108a, 108b having a catalytic center 110 has a macrocyclic ligand 112a, 112b chelated with the catalytic center 110. In one approach, the macrocyclic ligand is a multifunctional macrocyclic polyamine. In one approach, the catalytic sites 108*a*, 108*b* are crosslinked together. The macrocyclic ligand 112*a* has a functional group 114 crosslinked to an adjacent macrocyclic ligand 112*b* for forming the network 106 of catalytic sites 108*a*, 108*b*.

In one approach, each catalytic center includes a tetra-functional catalytic center. A tetrafunctional center is defined as having four ligands chelated to a metal (located in the center). For example, a tetrafunctional center may describes one metal complex that includes four nitrogens of the ligand (e.g., cyclen) chelating the metal. As another example, a [12]aneN3 ligand has three nitrogens, so the metal complex includes three coordinating/chelating atoms to a center metal. Moreover, each metal complex includes an additional fourth and possibly a fifth ligand to the metal complex where the additional ligand is water that is present and available for hydrolysis/degradation of the CWA.

The catalytic site may be a tunable structure made of a coordinating macrocycle to a metal center that hydrolyzes various electrophilic agents. In one approach, the catalytic center 110 of the catalytic sites 108*a*, 108*b* may include a metal cation. For example, a catalytic center may include the following exemplary metals, but not limited to, zinc ($Zn^{2+}$), copper ($Cu^{2+}$), iron ($Fe^{3+}$), cobalt ($Co^{2+}$, $Co^{3+}$), nickel ($Ni^{2+}$), zirconium ($Zr^{4+}$), etc.

Preferably, the catalytic center has a coordinating atom number greater than 3. A coordinating atom number (e.g., 4N, 5N, etc.) refers to the number of atoms, ions, molecules, etc. that the catalytic center (e.g., metal cation) holds as its nearest neighbors in a complex or coordination network. For example, a metal cation (e.g., $Zn^{2+}$) that typically has a coordination atom number of 4 can form complexes with at least three amine groups (e.g., ligands) of a macrocyclic polyamine.

In the catalytic center, the metal ion assists in the chemistry of deactivating an agent, but the coordinating atoms to the metal ion are critical for the deactivation process. For example, in a macrocyclic ligand that has 4 nitrogens coordinating a zinc atom (such as cyclen), the nitrogens are contributing electron density to the zinc. When water coordinates to the zinc, the extra electron density causes the water to become acidic thereby resulting in a catalytic Zn—OH group, which can only be formed with zinc (and other metal ions) coordinated with electron donating groups such as nitrogen, sulfur, and to a lesser extent oxygen.

In one example, a catalytic center includes a zinc cation ($Zn^{2+}$) where hydroxide ions of water become coordinated to the $Zn^{2+}$ center, thereby causing the water solution to become more acidic (increased $H^+$) so that $pK_a$ of the water drops significantly, where the pKa indicates the strength of the acid where a lower $pK_a$ value indicates a stronger acid. The extent of reduction of the $pK_a$ of the water will depend on the type of metal cation catalytic center, e.g., the coordination of hydroxide ions to the metal cation. In addition, the extent of chelation of hydroxide ions (and accompanying reduction in $pK_a$ value) will also depend on the nature of the chelating center formed by the macrocyclic ligand, e.g., the "cyclen" molecule with 4 nitrogen ligand groups. Thus, the type of metal cation and the chelating center formed by the macrocyclic ligand are two factors that change the $pK_a$ for the water.

In some approaches, divalent cations may have an extra coordination with water, e.g., Ni, Co, Cu, etc. In one approach, Zn may be included in a preferred catalytic center. The hydroxide is formed from water coordination with Zn cation creating the essential catalytic group Zn—OH which then reacts with the electron dense chemical agent, e.g., via an elimination reaction, and deactivate the chemical agent, e.g., a Sarin molecule, and then Zn molecule becomes immediately available for coordination with a new hydroxide from a water molecule, which may be picked up from moisture in the environment.

In one embodiment, a membrane may include a third layer coupled to the second layer. In one approach, a third layer may be a sublayer of the second layer, for example, the third layer has a different catalytic center than the second layer, but includes the same crosslinking chemistry, e.g., changing from cyclen-type catalytic center to a porphyrin-type catalytic center. The third layer may include a network of catalytic sites that are a different type than the catalytic sites of the chemically reactive second layer. For example, the third layer of the membrane may include a heterocyclic macrocyclic compound porphyrin that chelates Fe to promote oxidative degradation.

In one approach, a second type of catalytic center may be added to the reactive network. The number of coordinating ligands of the macrocyclic ligand available to chelate a metal cation may affect the $pK_a$ of the water, and thus provide a different reactivity to chemical agents. In one approach, a catalytic center having a configuration of coordinating ligands to modify the $pK_a$ of the water may be added to the reactive network. For example, the third layer of the membrane may include a heterocyclic macrocyclic compound with 5 coordinating ligands instead of 4. In another approach, a catalytic center having a different metal ion to modify the $pK_a$ of the water may be added to the reactive network.

In one embodiment, efficiency of physical blockage and/or inactivation of chemical/biological threat(s) may be maximized by designing and tuning the type and size of the complementary units. As shown in FIG. 2, one embodiment includes a process 201 of designing, tuning, and forming a membrane 200 for a specific application. For example, in one approach, an ultrapermeable membrane is designed that includes a first layer 202 comprising a material 203 that breathes, e.g., the material 203 is permeable to water vapor.

The process 201 described herein may tune the second layer 204 to independently select the complementary units to tune film reactivity (e.g., catalytic center 210) and pore size $p_{SL}$ (e.g., isocyanate linker) in the sub-2-nanometer regime. In one aspect, design and tuning of the catalytic site 208 allows the chemically reactive second layer 204 to destroy, decompose, deactivate, etc. chemical and biological agents. In one approach, and not meant to be limiting in any way, the catalytic site 208 of the network 206 formed as the second layer 204 may be tuned in part by computation design for targeting specific CWA agents, viruses, etc. In addition, for optimal catalytic sites 208, a multifunctional macrocyclic polyamine 212 may be tuned for an optimal coordination with a catalytic center 210. The architecture of the membrane may be predefined to incorporate multiple types of heterogeneous catalytic centers into a single membrane layer to enable multiplexed protection against a broad spectrum of threats.

Figure 2:
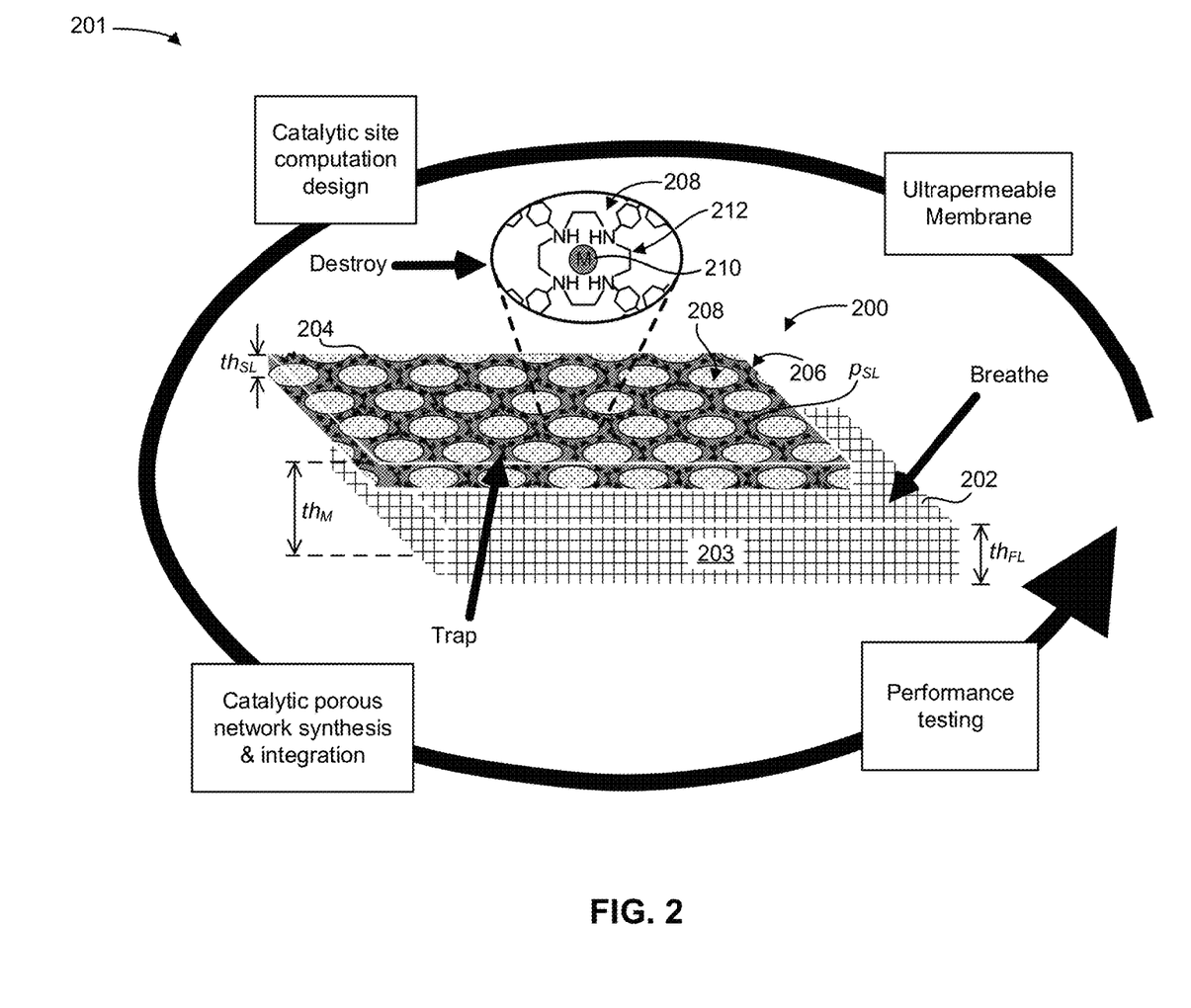
FIG. 2 is a schematic drawing of a permeable membrane having a chemical reactive layer, according to one embodiment.

In another aspect of the process 201 of designing and tuning the membrane 200, a specifically tuned catalytic porous network synthesis and integration enables the second layer 204 to trap or sieve for size exclusion some chemical and biological agents. In one embodiment, the layer-by-layer fabrication method as described herein allows formation a membrane with precise control of the network thickness at molecular scale and thus minimizes weight and thermal burden of the resulting reactive membrane.

In the perspective view of the membrane 200 of FIG. 2, a thickness $th_M$ of the membrane 200 may be greater than about 5 nanometers (nm) and less than about 1000 microns (μm) but may be smaller or larger. In some approaches for preferred breathability, a thickness $th_M$ of the membrane 200 may be in a range of greater than about 5 nm to less than about 500 μm. In some approaches, the thickness of the membrane may be less than about 1000 nanometers. In various approaches, a thickness $th_{SL}$ of the chemically reactive second layer 204 may be in a range of greater than 0 nanometers and less than about 100 nanometers but may be larger. In one approach, a thickness $th_{SL}$ of the chemically reactive second layer 204 may be in a range of greater than 0 nanometers and less than about 50 nanometers. A thickness $th_{FL}$ of the first layer 202 may be the difference between the thickness $th_M$ of the membrane 200 less the thickness $th_{SL}$ of the second layer 204.

In some approaches, a membrane may include a number of chemically reactive monolayers having catalytic centers in a range of greater than one to 100 layers. The number of layers may be defined by a desired property, for example, target transport rate, selectivity, protection, etc. that would be optimum for a particular chemical and/or biological agent (e.g., nerve agent, virus, etc.). The membrane may include a combination of properties against chemical and/or biological agents.

A final step in the process 201 of design and tuning a specific membrane 200 as described herein may include performance testing for protection and decomposition of the chemical warfare agents, viruses, biological threats, etc.

In one embodiment, a membrane for protection and decomposition of chemical and biological agents may additionally include a liner, a fiber layer, and/or a cover layer. In one approach, the outer most cover layer of the membrane exposed to the chemical and biological agents may have a coating. The layers may be arranged in any order. The layers may be positioned in an order as defined by a particular application.

Figure 3:
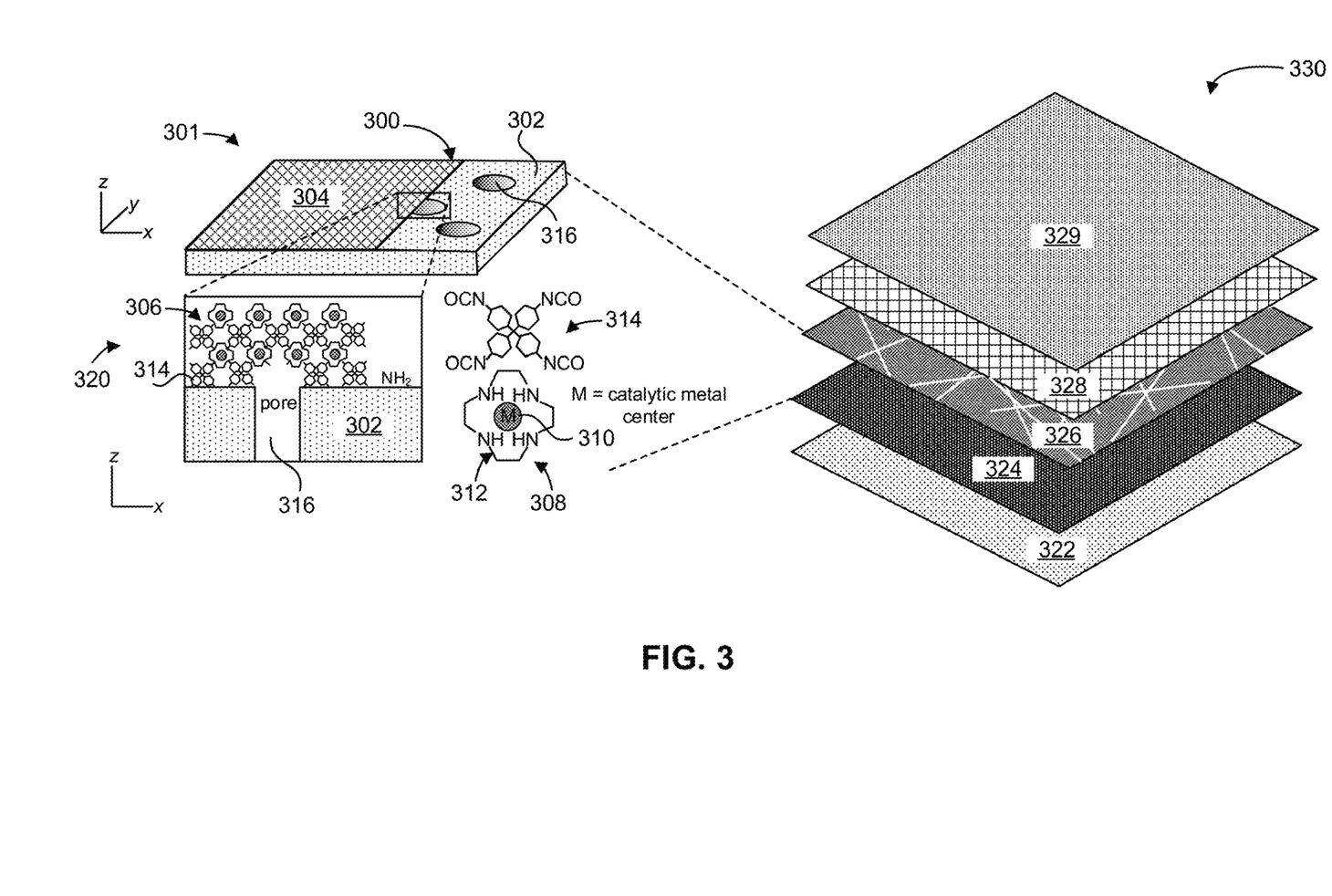
FIG. 3 is a schematic drawing of a material including a permeable membrane having a chemical reactive layer, according to one embodiment.

For example, as illustrated in the schematic drawing of FIG. 3, a material 330 may include a series of layers. The material 330 as shown may represent a conventional material used for PPE. A conventional version of material 330 may include a comfort liner 322 that is designed to soak up perspiration, build-up of water vapor, etc.

The material 330 may include an activated carbon cloth 324 positioned above the comfort liner 322. A carbon cloth 324 typically provides a protective layer to adsorb chemical threats.

In addition, the material 330 may include one or more fiber mats 326 positioned above the carbon cloth 324, a cover fabric 328 positioned above the fiber mats 326, and an omniphobic coating 329 on the cover fabric 328.

According to one embodiment, the membrane 300 may be included to modify material 330 by replacing one or more of the conventional layers typically included a material 330. In one approach, the membrane 300 may be positioned in a material such that the porous first layer 302 (e.g., permeable to water vapor) is in a position adjacent the skin of the wearer of the material 330. The porous first layer 302 may function as a separator between the ultrathin catalytic chemically reactive layer 304 and the skin of the wearer of the material 330. In some approaches, the membrane 300 may replace the comfort liner 322.

The membrane 300 may be positioned as an intermediate layer in the material. For example, the membrane 300 may be positioned in the place of a conventional activated carbon cloth 324. The membrane 300 inserted adjacent to the fiber mats 326 may sufficiently trap and/or deactivate chemical and/or biological agents. For example, as shown in the expanded perspective view 301 of membrane 300, the membrane 300 has a chemically reactive layer 304 and a porous layer 302 having a plurality of pores 316. The porous layer 302 may be comprised of 2D material, fabric, block copolymer, nanotubes, nanoporous graphene, etc. as described herein. The chemically reactive layer 304 includes a reactive network 306 of catalyst sites.

Looking at the two-dimensional perspective, a magnified view 320 of a vertical slice of the membrane 300 illustrates the reactive network 306 of catalyst sites 308 above the porous layer 302 having pores 316. The catalyst sites 308 of the reactive network 306 are crosslinked by functional side groups 314. The catalyst sites 308 include a catalytic metal center 310 complexed with amine ligands 312.

Moreover, as shown in the magnified view 320, the reactive network 306 may be coupled to the porous membrane by the crosslinking functional side groups 314. These are examples only and are not meant to be limiting in any way.

Figure 4:
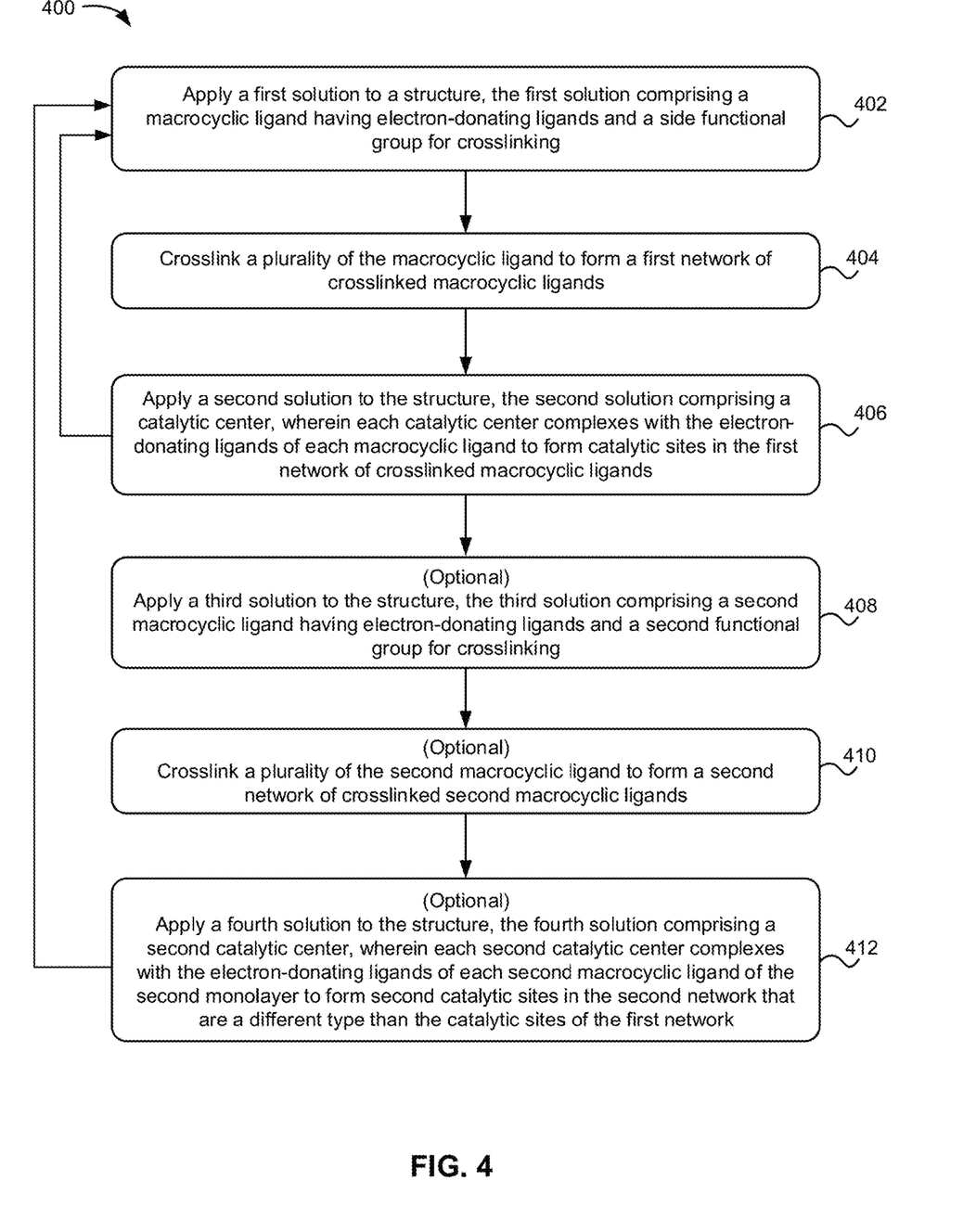
FIG. 4 is a flow chart of a method, according to one embodiment.

FIG. 4 shows a method 400 for forming a chemically reactive membrane, in accordance with one embodiment. As an option, the present method 400 may be implemented to form membranes such as those shown in the other FIGS. described herein. Of course, however, this method 400 and others presented herein may be used to form structures which may or may not be related to the illustrative embodiments listed herein. Further, the methods presented herein may be carried out in any desired environment. Moreover, more or less operations than those shown in FIG. 4 may be included in method 400 and possibly in different order, according to various embodiments. It should also be noted that any of the aforementioned features may be used in any of the embodiments described in accordance with the various methods.

Method 400 begins with operation 402 of applying a first solution to a structure. The first solution includes a macrocyclic ligand having electron-donating ligands and a side functional group for crosslinking. In one approach, the first solution may include a tetrafunctional macrocyclic molecule for chelating a catalytic center. The structure may be substrate, a material, a fiber, a permeable layer, a plastic film, a silicon wafer, etc.

Methods of application of a solution to a structure may include dipping, rinsing, submerging, spreading, spraying, etc. of the structure with the solution. These examples are not meant to be exhaustive, and the application of a solution may include other methods generally known by those skilled in the art.

In one approach, the structure (e.g., substrate) may be coated with complementary functionalities for crosslinking. In some instances, the surface of the substrate may be treated, modified, etc. to include complementary functionalities for crosslinking. In one approach, the structure may be coated with functional groups having amines for attaching a first layer to the structure. For example, the structure may be coated with an amine, and then application of the first layer of catalytic macrocycle having an isocyanate side functional group will initiate a crosslinking reaction between the amine coated on the structure and the isocyanate side group of the catalytic macrocycle. Application of the amine containing molecules followed by application of the macrocycle ligand having an isocyanate side group may be repeated to form multiple layers.

In another approach, click chemistry may be used to fuse the layers together. As a specific example, a copper(I)-catalyzed azide-alkyne cycloaddition reaction may be employed. This versatile reaction is orthogonal to many functionalities that may be present in the structure and, thus, provides an avenue for joining these structural elements together. In one example, a structure may be coated initially with an azide-displaying functionality and once the functional displayed azides are established, a first layer may be appended to the coated structure by adding a solution of an alkyne-containing catalytic macrocycle that, in the presence of catalytic amounts of Cu(I), tends to rapidly react with the displayed azides to form a triazole link. The triazole link forms a triazole ring that serves as the joining link between the structure and the first layer. This link is similar to the previously described amine/isocyanate link. In various approaches, building subsequent sets of layer(s) may follow a similar pattern.

In some approaches, the type of base substrate may depend on the application of the membrane. In one approach, for adding the chemically reactive membrane to a porous substrate, the formed chemically reactive membrane may be uncoupled from the original substrate so that the surface of the base of the chemically reactive membrane may be modified for coupling to a porous substrate. In one approach, the chemically reactive membrane may be transferred onto a porous substrate. In one approach, the overall properties of the two layer system may be altered by integrating a different chemically reactive layer above the first chemically reactive layer.

The macrocyclic ligand includes coordinating/chelating ligands that donate electrons to the metal. Coordinating/chelating ligands include one of the following electron donors: nitrogen (N), oxygen (O), or sulfur (S). In some approaches, the macrocyclic ligand is a polyamine including 3 or greater amine groups as electron donating ligands. Preferably, the multifunctional macrocyclic polyamine includes ligands for chelating a catalytic center having a coordinating atom number greater than 3.

In one approach, electron donors such as O and S may be included in a macrocyclic ligand having N moieties already in place. In some cases, O and S tend not to have the C—C bridges present in polyamine macrocycles (e.g., typically have two bonds and are part of the aromatic ring). Thus, preferably, additional functional groups may be included on the O- and/or S-macrocyclic ligands to function as structural support typically provided by the carbon bridges of the polyamine macrocyclic ligands for constructing multiple layers.

In a preferred approach, optimal catalyst sites may be tuned by selecting a macrocyclic ligand using one or more of the following properties: a chelating amine moiety having 3N, 4N, etc., the number of carbons between the amine moieties (N) to define the size of chelating ring, the $pK_a$ of the macrocyclic ligand in water, etc.

Figure 5:
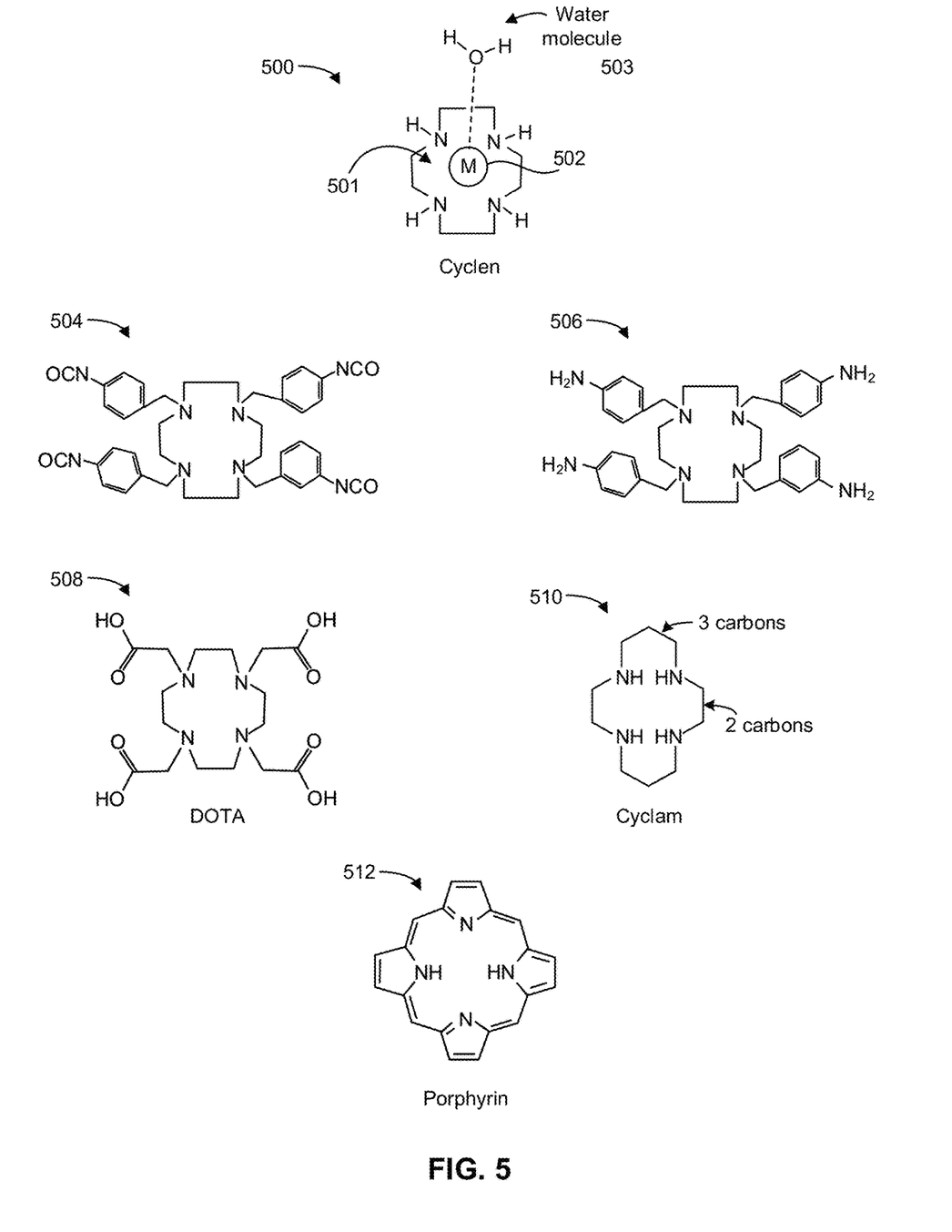
FIG. 5 illustrates candidates of a macrocyclic amine ligand for the chemical reactive layer, according to various approaches.

As illustrated in FIG. 5, examples of macrocyclic ligands having at least three amine moieties include cyclen 500, and a derivatives of cyclen 504, 506, and dodecane tetraacetic acid (DOTA) 508. As shown for cyclen 500, a catalytic center 501 may include a metal cation 502 thereby coordinating (dashed line) with a water molecule 503. Derivatives of cyclen 504, 506, have the cyclen-like structure that includes a bridge of 2 carbons between 2 nitrogens. Cyclam 508 and cyclam-like macrocyclic ligands have additionally a bridge of 3 carbons between 2 nitrogens. For example, in one approach, a macrocyclic ligand may include a bridge of 3 carbons between each nitrogen with 3 N in the chelating center such that the geometry may affect $pK_a$ of the water and determine which molecules may coordinate to the metal center.

In some approaches, the amine moieties, N, may be alkyl amines groups, e.g., $CH_2$—$CH_2$—$NH_2$, a heterocyclic amine ring, e.g., imidazole, porphyrins 512 having a pyrrole moiety on the four corners of the porphyrin ring, etc. In some approaches, macrocyclic polyamines may include porphyrins. These are presented by way of example only and are not meant to be limiting in any way.

In one embodiment, each macrocyclic includes a functional group for crosslinking adjacent macrocyclic molecules to form a network of catalyst sites. Preferably, in some approaches, the macrocycle may be modified with the functional group for crosslinking before preparing the first solution. In one approach, a solution including the functional group may be applied to the structure before applying the first solution of the macrocycle to the structure, and a crosslinking reaction occurs when the first solution of macrocycle contacts the structure having the functional group for crosslinking. The macrocyclic ligands, e.g., cyclen, cyclam, etc. may be purchased from a commercial source. A modified macrocyclic ligand with a functional side group for crosslinking may be synthesized using standard chemical procedures generally known by one skilled in the art.

Preferably, the functional group having side functionality is an electron donating substituent toward the adjacent, nearby, bonded, etc. electron-donating ligand. In various approaches, examples of functional groups for crosslinking include: an isocyanate, an isocyanate counter monomer, an isothiocyanate, an azide monomer, a terminal alkyne-displaying monomer, etc.

Other reactive pairs for the crosslinking reaction include, but are not limited to, click chemistry that employs reactive partners that display azides and alkyne moieties separately. Click chemistry generates a triazole ring as a linking moiety between functional groups thereby providing greater stability in contrast to the formation of a urea or a thiourea linking moiety that is generated by the reaction between an amine and an isocyanate or an isothiocyanate functional group, respectively.

Figure 6A:
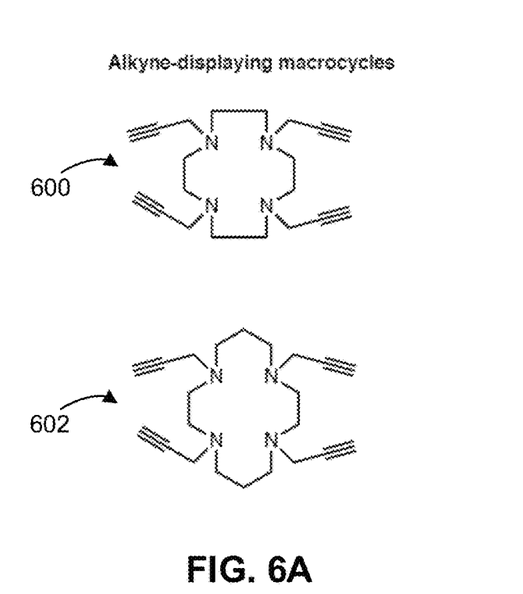
FIG. 6A illustrates macrocyclic ligands having alkyne-displaying functional groups, according to one approach.
Figure 6B:
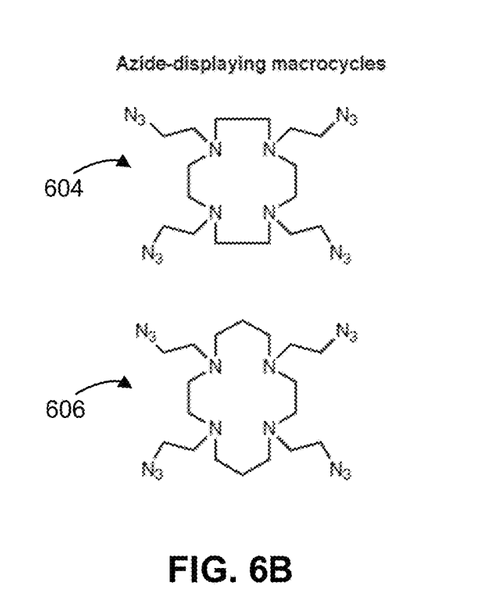
FIG. 6B illustrates macrocyclic ligands having azide-displaying functional groups, according to one approach.

FIGS. 6A and 6B depict schematic drawings of macrocyclic ligands having various side functional groups. FIG. 6A illustrates terminal alkyne-displaying functional groups on a cyclen macrocycle 600 and an alkyne-displaying functional groups on a cyclam macrocycle 602. FIG. 6B illustrates azide-displaying functional groups on a cyclen macrocycle 604 and azide displaying functional groups on a cyclam macrocycle 606.

Figure 6C:
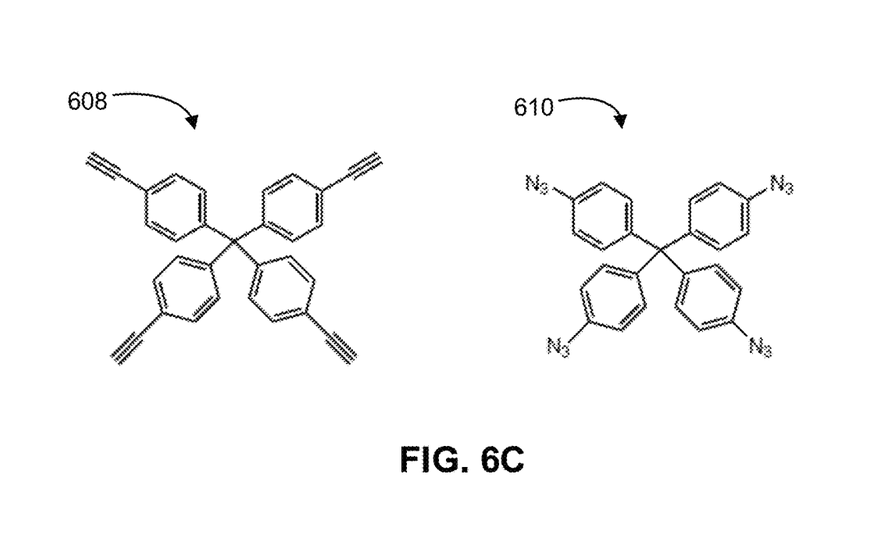
FIG. 6C illustrates complementary functionalities on a structure for attachment of macrocyclic ligands, according to one approach.

FIG. 6C illustrates complementary functionalities on a structure, substrate, etc. for attachment of macrocycles, e.g., alkyne-displaying functional groups on a terminal alkyne-complementary block 608, azide-displaying functional groups on an azide complementary block 610.

In one approach, ultrathin (5-100 nm) covalent membrane networks may be formed by alternate dipping of a convenient substrate into solutions of two key units: a catalytic center with cross-linking side functionalities and a complementary multi-functional isocyanate monomer, or a multi-functional azide monomer, or a terminal alkyne-displaying monomer, etc. for network formation.

Operation 404 of method 400 includes crosslinking a plurality of the macrocyclic ligand to form a first network of crosslinked macrocyclic ligands. The crosslinking of the macrocyclic ligands occurs at room temperature for a duration of time in a range of less than a minute. The crosslinking occurs when the macrocyclic ligand contacts the complementary functionality of the substrate.

Operation 406 of method 400 includes applying a second solution to the structure. The second solution includes a catalytic center, wherein each catalytic complexes with the electron-donating ligands of each macrocyclic ligand to form catalytic sites in the first network of crosslinked macrocyclic ligands. In preferred approaches, the catalytic center has a coordination atom number greater than 3.

In some approaches, the catalytic center includes a metal cation, for example, for example, but not limited to $Zn^{2+}$, $Cu^{2+}$, $Fe^{3+}$, $Co^{2+}$, $Ni^{2+}$, $Zr^{4+}$, etc.

The second solution may include a metal salt, for example for a $Zn^{2+}$ catalytic center, any of Zn salts, e.g., zinc chloride, zinc acetate, etc. in a solvent, e.g., methanol. The metal salt solution is applied to the membrane having the macrocyclic amine ligands with the side functional group crosslinked on the structure. Methods of application of the metal salt solution may include dipping, rinsing, submerging, spreading, spraying, etc. the membrane with the metal salt solution. The macrocyclic amine ligand, e.g., cyclen, cyclam, etc. have a high affinity to chelate the metal (e.g., similar to EDTA), and grabs the metal from the solution. No additional conditions are needed for forming the metal complexes in the chelating center, e.g., no force, no heating, etc. The forming of the metal complex between the metal cation and the macrocyclic amine ligands is substantially spontaneous.

In various approaches, the reactivity of the catalyst sites toward chemical threats (e.g., VX, GB, HD, etc.) may be tunable over a large parameter space that includes: macrocycle ring sizes (e.g., cyclen [12]aneN4, cyclam [14]aneN4, etc.), coordinating atom number (e.g., 4N, 5N, etc.) and identity (e.g., N, O, S), type of metal centers (i.e., $Zn^{2+}$, $Cu^{2+}$, $Fe^{3+}$, $Co^{2+}$, $Ni^{2+}$, $Zr^{4+}$ etc.), and side functionality for crosslinking.

In some approaches, the method 400 may loop back to step 402 for applying another layer of the first solution to the structure. The steps 400 through 402 and/or 402 through 406 may be repeated multiple times to obtain desired physical properties of the membrane. Physical properties of the membrane include a desired thickness, breathability, protection level, etc.

In another approach, a second class of catalytic centers to be incorporated in the network, e.g., alone or in tandem with a first class of catalytic centers may include macrocycles. For example, a second class of catalytic centers may include porphyrins that promote oxidative degradation. Method 400 may include optional operations including operation 408 of applying a third solution to the structure. The third solution may include a second macrocyclic ligand having electron-donating ligands and a second functional group for crosslinking. In one approach, the second macrocyclic ligand is different from the macrocyclic ligand applied in operation 402. In one approach, the second functional group is a different type than the functional group of the macrocyclic ligand applied in operation 402.

Following application of the third solution, operation 410 includes crosslinking a plurality of the second macrocyclic ligand to form a second network of crosslinked second macrocyclic ligands.

Operation 412 includes applying a fourth solution to the structure. The fourth solution includes a second catalytic center, wherein each second catalytic center complexes with the electron-donating ligands of each second macrocyclic ligand to form second catalytic sites in the second network that are a different type than the catalytic sites of the first network. In one approach, the catalytic center of the first network and the catalytic center of the second network are different.

In some approaches, the chemically reaction membrane formed in method 400 is comprised of a plurality of layers. For example, one layer comprises the first network of catalytic sites and a second layer comprises the second network of catalytic sites. In one approach, one layer comprises a combination of the first network of catalytic sites and the second network of catalytic sites wherein the catalytic sites of the first network are different from the catalytic sites of the second network. In one approach, the first network of catalytic sites has a different porosity to the second network of catalytic sites thereby forming a gradient of porosity in the series of networks.

In some approaches, the method 400 may loop back to step 402 for applying another layer of the first solution to the structure. The steps 400 through 402 and/or 402 through 406 may be repeated multiple times to obtain desired physical properties of the membrane. Physical properties of the membrane include a desired thickness, breathability, protection level, etc.

In one approach, following formation of the chemically reactive membrane, the ultrathin chemically reactive membrane may be released from the structure. In one approach, the ultrathin chemically reactive membrane may be transferred on other supports (e.g., fabrics, porous membranes, etc.). In one approach, the structure may be a sacrificial structure that can be removed by solvent. For example, the layers may be formed on a substrate of alumina (or coating of alumina), and thus exposure of the membrane to solvent may release the membrane from the alumina.

In Use

Various aspects of an inventive concept described herein may be developed for chemical/biological protective and breathable membranes for military, first-responders, medical personnel, etc. The material disclosed herein may be applicable to uses of self-decontaminating coatings, garments, etc.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed is:

1. A membrane comprising:
   a first layer; and
   a second layer coupled to the first layer, the second layer comprising a network of catalytic sites, each catalytic site having a catalytic center characterized by promoting a chemical reaction of a target material,
   wherein each catalytic site has a macrocyclic ligand chelated with the catalytic center.

2. The membrane as recited in claim 1, wherein the catalytic sites are crosslinked together.

3. The membrane as recited in claim 1, wherein each catalytic center is a tetrafunctional catalytic center.

4. The membrane as recited in claim 1, wherein the macrocyclic ligand has a functional group crosslinked to an adjacent macrocyclic ligand for forming the network of catalytic sites.

5. The membrane as recited in claim 1, wherein the catalytic center includes a metal cation.

6. The membrane as recited in claim 5, wherein the metal cation is selected from the group consisting of: zinc, copper, iron, nickel, cobalt, and zirconium.

7. The membrane as recited in claim 1, wherein the catalytic center has a coordinating atom number greater than 3.

8. The membrane as recited in claim 1, wherein the first layer is impervious to a target material.

9. The membrane as recited in claim 1, wherein the first layer is porous.

10. The membrane as recited in claim 9, wherein an average diameter of the pores of the first layer is in a range of greater than 0 nanometers to less than 100 microns.

11. The membrane as recited in claim 1, wherein the second layer is configured to trap chemical and/or biological agents.

12. The membrane as recited in claim 1, wherein the second layer is porous, wherein an average diameter of the pores of the second layer is in a range of greater than zero to less than two nanometers.

13. The membrane as recited in claim 1, comprising a third layer coupled to the second layer, the third layer comprising a network of second catalytic sites that are a different type than the catalytic sites of the first layer.

14. The membrane as recited in claim 1, wherein a thickness of the second layer is less than 100 nanometers.

15. The membrane as recited in claim 1, wherein a thickness of the membrane is in a range of greater than about 5 nanometers to less than about 1000 microns.

16. The membrane as recited in claim 1, wherein the first layer comprises at least one material selected from the group consisting of: fabrics, block copolymers, electrospun fibers, electrospun nanofibers, non-woven fabrics, two-dimensional layered materials, nanoporous single layers, metal organic framework (MOF), nanotube mats, oriented arrays, polymer composites, and a combination thereof.

17. The membrane as recited in claim 1, wherein the first layer is permeable to water vapor.

18. The membrane as recited in claim 1, further comprising:
   a liner layer;
   a fiber layer; and
   a cover layer.

19. A method of forming the membrane of claim 1, the method comprising:
   applying a first solution to a structure, the first solution comprising the macrocyclic ligand having electron-donating ligands and a side functional group for crosslinking;
   crosslinking a plurality of the macrocyclic ligand to form a first network of crosslinked macrocyclic ligands; and
   applying a second solution to the structure, the second solution comprising the catalytic center, wherein each catalytic center complexes with the electron-donating ligands of each macrocyclic ligand to form catalytic sites in the first network of crosslinked macro cyclic ligands.

20. The method as recited in claim 19, wherein the macrocyclic ligand is selected from the group consisting of: cyclen, cyclam, porphyrin, and dodecane tetraacetic acid (DOTA).

21. The method as recited in claim 19, wherein the catalytic center has a coordination atom number of 3 or greater.

22. The method as recited in claim 19, wherein the catalytic center is a metal cation selected from the group consisting of: zinc, copper, iron, nickel, cobalt, and zirconium.

23. A membrane comprising:
   a first layer; and
   a second layer coupled to the first layer, the second layer comprising a network of catalytic sites, each catalytic site having a catalytic center characterized by promoting a chemical reaction of a target material,
   wherein each catalytic site having the catalytic center has a macrocyclic ligand chelated with the catalytic center,
   wherein the macrocyclic ligand has a functional group crosslinked to an adjacent macrocyclic ligand for forming the network of catalytic sites.

24. The membrane as recited in claim 23, wherein the catalytic sites are crosslinked together.

25. The membrane as recited in claim 23, wherein each catalytic center is a tetrafunctional catalytic center.

26. A membrane comprising:
   a first layer; and
   a second layer coupled to the first layer, the second layer comprising a network of catalytic sites, each catalytic site having a catalytic center characterized by promoting a chemical reaction of a target material,
   wherein each catalytic center is a tetrafunctional catalytic center.

27. The membrane as recited in claim 26, wherein the catalytic sites are crosslinked together.

28. The membrane as recited in claim 26, wherein the catalytic center has a coordinating atom number greater than 3.

* * * * *